United States Patent
Ramachandra et al.

(10) Patent No.: US 8,924,273 B2
(45) Date of Patent: Dec. 30, 2014

(54) SIMPLIFYING MIGRATION FROM ONE FINANCIAL CONSOLIDATION APPLICATION TO ANOTHER

(75) Inventors: Thilak Ramachandra, Bangalore (IN); Yuen Man Boronski, Monroe, CT (US); Murali Govindarajulu, Bangalore (IN); Subhashish Lahiri, Bangalore (IN); Goutam Mishra, Bangalore (IN); Manoj Gangadharan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/269,633

(22) Filed: Oct. 10, 2011

(65) Prior Publication Data

US 2012/0109805 A1 May 3, 2012

Related U.S. Application Data

(60) Provisional application No. 61/407,448, filed on Oct. 28, 2010.

(51) Int. Cl.
G06Q 40/00 (2012.01)
G06Q 10/10 (2012.01)

(52) U.S. Cl.
CPC .............. *G06Q 40/00* (2013.01); *G06Q 10/10* (2013.01)
USPC ................................ 705/35; 705/38; 705/39

(58) Field of Classification Search
USPC .......................................................... 705/35
See application file for complete search history.

(56) References Cited

U.S. PATENT DOCUMENTS

| | | | |
|---|---|---|---|
| 8,468,090 B2* | 6/2013 | Lesandro et al. | 705/39 |
| 2009/0125595 A1* | 5/2009 | Maes | 709/206 |
| 2009/0132220 A1* | 5/2009 | Chakraborty et al. | 703/13 |
| 2010/0153865 A1* | 6/2010 | Barnes et al. | 715/762 |
| 2010/0205302 A1* | 8/2010 | Rechterman | 709/226 |
| 2011/0134804 A1* | 6/2011 | Maes | 370/259 |
| 2011/0179111 A1* | 7/2011 | Ravichandran et al. | 709/203 |

OTHER PUBLICATIONS

Exhibit A "Enterprise to HFM Conversion", Revision 2.0, dated Dec. 12, 2008.*

* cited by examiner

*Primary Examiner* — Hai Tran
(74) *Attorney, Agent, or Firm* — Narendra Reddy Thappeta

(57) ABSTRACT

Facilitating the migration of financial data from a first financial consolidation application (FCA) to a second FCA. According to one aspect, transactions classified according to categories in the first FCA are migrated to the second FCA associated with values of dimensions, based on a mapping between the categories and the values of the dimensions specified by a user. According to another aspect, substructures storing break up information related to the transactions in the first FCA are migrated to corresponding subset of dimensions in the second FCA, based on the mapping between the substructures and the subset of dimensions specified by a user. Accordingly to one more aspect, accounts specified according to corresponding conventions in chart logics in the first FCA are migrated to the second FCA as corresponding portions of the account hierarchy, while ensuring that the migrated accounts are computed according to the corresponding convention.

20 Claims, 13 Drawing Sheets

Lastyr ←—420
1
12
US100,SOURCE,948376,984845,896344,1023823,986426,991437,807769,975854,944634,1023810,..
US100,SOURCE.ABS,24272,20055,20328,22646,26362,4886,18875,28433,29869,20142,23844,1416
US100,SOURCE.AVE,21881,31998,10322,18651,10021,5699,3557,28476,27892,24389,5075,10712
US100,SOURCE.BAS,2600,2510,21003,26869,17861,14688,13401,9789,15255,16423,5002,10585
US100,SOURCE.CAT,24182,10285,27088,31426,28617,23757,9832,30932,4169,2154,25721,17189

*FIG. 4A*

!Data
'<scenario>;<year>;<period>;<view>;<entity>;<acct>;<ICP>;<c1>;<c2>;<c3>;<c4>;<value>

451 —▶ Actual; 2007; Quarter1; YTD; US100; Build ; [ICP None]; Closing; [None]; [None];100
452 —▶ Actual; 2007; Quarter1; YTD; US100; Inv    ; Germany  ]; Closing; [None]; [None];200
453 —▶ Actual; 2007; Quarter1; YTD; US100; Inv    ; Spain     ; Closing; [None]; [None];300
        Actual; 2007; Quarter1; YTD; US100; Recltc; Germany   ; Closing; [None]; [None];400
        Actual; 2007; Quarter1; YTD; US200; Build ; [ICP None]; Closing; [None]; [None];110
        Actual; 2007; Quarter1; YTD; US200; Inv    ; Germany  ]; Closing; [None]; [None];220
        Actual; 2007; Quarter1; YTD; US200; Inv    ; Spain     ; Closing; [None]; [None];330
        Actual; 2007; Quarter1; YTD; US200; Recltc; Germany    ; Closing; [None]; [None];440

*FIG. 4B*

Actual
1
1
721 → US100.CC100 , Sales ,100
722 → US100.CC200 , Sales ,200
723 → US100.CC300 , Sales ,250

*FIG. 7A*

!Category=Actual
!Year=2008
!Period=January
!View=YTD
!Data

'<entity>;  <value>;  <acct>;  <ICP> ; <C1>; <C2>; <C3>; <C4> ; <amount>

741 → US100 ; V#<Entity Currency> ;Sales ; [ICP None]; [None]; [None]; CC100 ; 100
742 → US100 ; V#<Entity Currency> ;Sales ; [ICP None]; [None]; [None]; CC200 ; 200
743 → US100 ; V#<Entity Currency> ;Sales ; [ICP None]; [None]; [None]; CC300 ; 250

*FIG. 7B*

Actual
1
1
761 → US100.Input , Sales, 100
762 → US100.Trans, Sales , 200

*FIG. 7C*

!Category=Actual
!Year=2008
!Period=January
!View=YTD
!Data

'<entity>;  <value>;  <acct>;  <ICP> ; <C1>; <C2>; <C3>; <C4> ; <amount>

781 → US100; V#<Entity Currency>;Sales ; [ICP None]; [None]; [None]; [None]; 100
782 → US100; V#<Parent Currency>;Sales; [ICP None]; [None]; [None]; [None]; 200

*FIG. 7D*

SIMPLIFYING MIGRATION FROM ONE FINANCIAL CONSOLIDATION APPLICATION TO ANOTHER

RELATED APPLICATION

The present application is related to and claims priority from U.S. Provisional Application Ser. No. 61/407,448, entitled, "MIGRATION OF DATA FROM ONE CONSOLIDATION APPLICATION TO ANOTHER", filed on 28 Oct. 2010, which is incorporated in its entirety herewith into the present application.

BACKGROUND OF THE INVENTION

1. Technical Field

The present disclosure relates to financial management systems, and more specifically to simplifying migration from one financial consolidation application to another (financial consolidation application).

2. Related Art

A financial consolidation application refers to a software application which provides a consolidated (often single) view of financial information maintained corresponding to different business entities (e.g., based on geography, function, etc.) of a business organization. For example, respective portions of financial information may be maintained for corresponding entities such as an India subsidiary entity and a US parent entity, and a consolidation application provides a consolidated view of the both portions of the information. Having such consolidated information provides various advantages such as identification of key trends, generation of reports based on aggregate data, etc.

There is often a need for organizations to migrate from one financial consolidation application to another. For example, there are some financial consolidation applications which are suited for small or mid-size organizations, while there are other financial consolidation applications which are suited for large sized organizations. A business may accordingly need to migrate from one consolidation application (e.g., Hyperion Enterprise application suited for smaller organizations) to another application (e.g., Hyperion Financial Management—Fusion Edition, Application suited for larger organizations) as the organization grows. Both the applications are available from Oracle Corporation, the intended assignee of the subject application.

There is accordingly a need to simplify migration from one financial consolidation application to another.

BRIEF DESCRIPTION OF THE DRAWINGS

Example embodiments of the present invention will be described with reference to the accompanying drawings briefly described below.

FIG. 4A depicts a portion of a data file maintained by source financial consolidation application for storing financial transactions in one embodiment.

FIG. 4B depicts a portion of a data file maintained by the target financial consolidation application and containing transactions migrated from the source financial consolidation application in one embodiment.

FIG. 7A depicts a portion of a data file maintained by source financial consolidation application for storing financial transactions and cost center information in substructures in one embodiment.

FIG. 7B depicts a portion of a data file maintained by the target financial consolidation application and containing cost center substructures migrated from the source financial consolidation application in one embodiment.

FIG. 7C depicts a portion of another data file maintained by source financial consolidation application for storing financial transactions and currency translation information in substructures in one embodiment.

FIG. 7D depicts a portion of a data file maintained by the target financial consolidation application and containing currency translation substructures migrated from the source financial consolidation application in one embodiment.

Figure 9A:
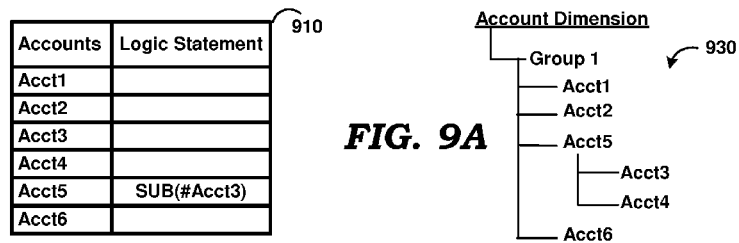
Figure 9B:
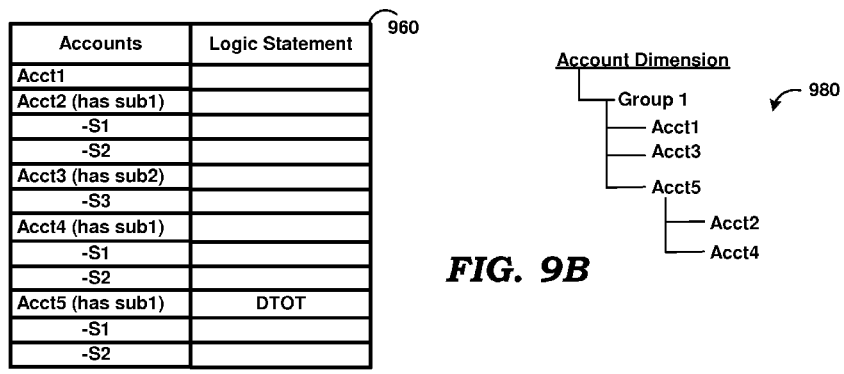

Each of FIGS. 9A and 9B illustrates the manner in which a chart logic of a source financial consolidation application is migrated to an account hierarchy of a target financial consolidation application in one embodiment.

Figure 10:
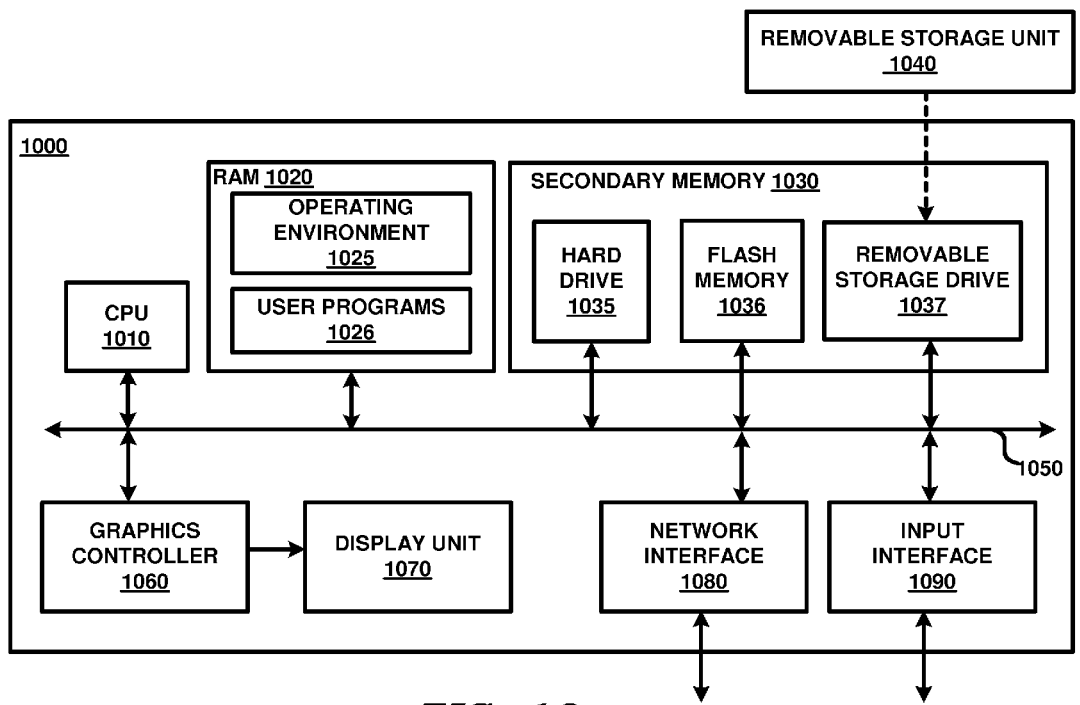

FIG. 10 is a block diagram illustrating the details of a digital processing system in which various aspects of the present invention are operative by execution of appropriate executable modules in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Overview

An aspect of the present invention facilitates the migration of financial data from a first financial consolidation application to a second financial consolidation application when the financial data is classified differently in the first and second financial consolidation applications. In one embodiment, a digital processing system identifies a set of categories according to which transactions are classified in the first financial consolidation application, and then enables a user to specify, for each of the set of categories, corresponding ones of the (coordinate) values for each of a set of dimensions.

The system then stores, in the second financial consolidation application, the transactions classified according to the corresponding ones of values for the set of dimensions specified for the set of categories. For example, a transaction of a first category in the first financial consolidation application is stored in the second financial consolidation application associated with the values for the set of dimensions specified for the first category by the user.

Another aspect of the present invention facilitates migration of substructures storing break up information related to the transactions from the first financial consolidation application to the second financial consolidation application. In one embodiment, the system identifies a set of substructures storing the break up information in the first financial consolidation application, and then enables a user (possibly the same user noted above) to specify, for each of the set of substructures, a corresponding one of a subset of dimensions (noted above). The system then stores, in the second financial consolidation application, the break up information related to the transactions in the corresponding ones of the subset of dimensions.

One more aspect of the present invention facilitates migration of computed accounts from the first financial consolidation application to the second financial consolidation application. In one embodiment, the system examines a chart logic (containing an ordered sequence of accounts) of the first financial consolidation application to determine that an (computed) account is specified according to a convention. The system then identifies a set of accounts in the chart logic indicated by the convention, and then adds to an account dimension hierarchy of the second financial consolidation application, the account as an inner node and the identified set of accounts as children of the inner node.

One example convention may specify a second account indicating that a first computed account is defined to be a sum of the set of accounts formed by the second account and any intervening accounts between the second account and the first account in the ordered sequence of accounts (of the chart logic). Another convention may specify that a third computed account is to be sum of a third set of accounts, where each account in the third set has the (set of) sub-accounts identical to the sub-accounts of the third computed account.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

II. Example Environment

Figure 1:
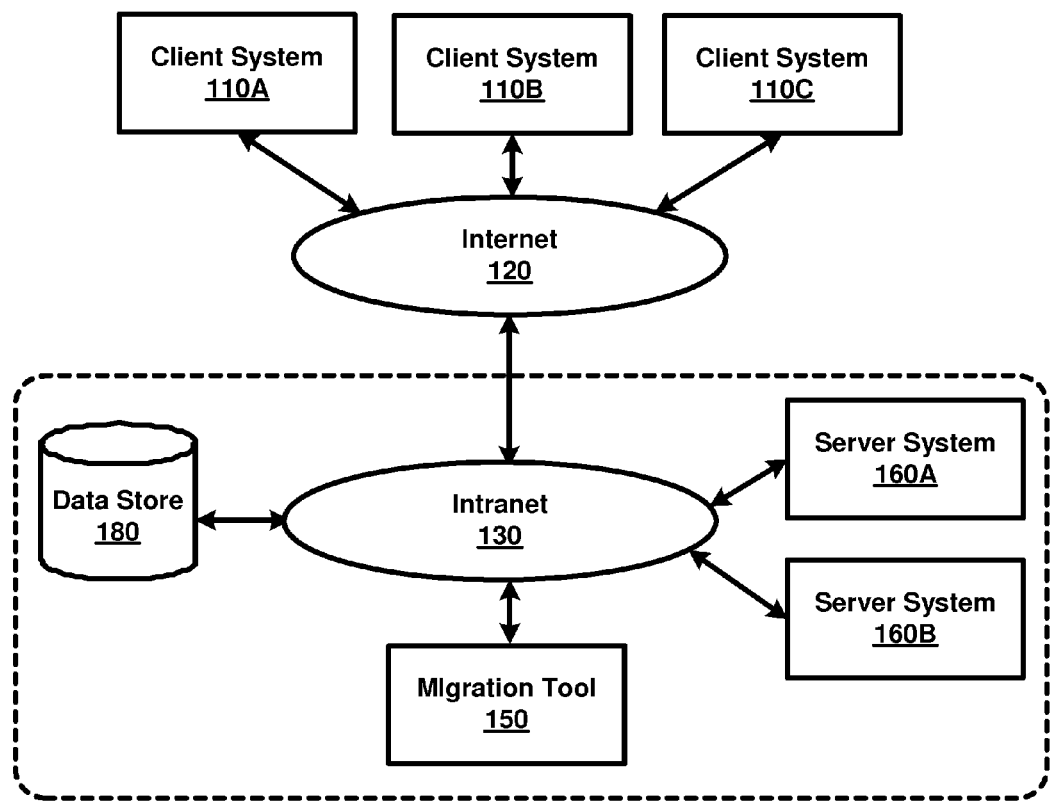
FIG. 1 is a block diagram illustrating an example environment (or computing system) in which several aspects of the present invention can be implemented.

FIG. 1 is a block diagram illustrating an example environment (or computing system) in which several aspects of the present invention can be implemented. The computing system is shown containing client systems 110A-110C, Internet 120, intranet 130, migration tool 150, server systems 160A-160B, and data store 180.

Merely for illustration, only representative number/type of systems and/or sites is shown in the Figure. Many environments often contain many more systems, both in number and type, located at different sites/locations depending on the purpose for which the environment is designed. Each component/block of FIG. 1 is described below in further detail.

Intranet 130 represents a network providing connectivity between migration tool 150, server systems 160A-160B, and data store 180 all provided within an enterprise (as indicated by the dotted boundary). Internet 120 extends the connectivity of these (and other systems of the enterprise) with external systems such as client systems 110A-110C.

Each of intranet 130 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 130. When the packet contains content such as port numbers, which specifies the target application, the packet may be said to be directed to such application as well.

Each of client systems 110A-110C represents a system such as a personal computer, workstation, mobile station, etc., used by end users to generate (user) requests directed to business/financial applications executing in server systems 160A-160B. The users may be internal users such as employees/administrators of the different business entities/organization or external users such as customers/vendors/suppliers of the business entities/organization. The requests may be generated using appropriate user interfaces. In general, a client system requests an application for performing desired tasks and receives corresponding responses containing the results of performance of the requested tasks. Each request is sent in the form of an IP packet directed to the desired server system, with the IP packet including data identifying the desired tasks in the payload portion.

Data store 180 represents a non-volatile (persistent) storage facilitating storage and retrieval of a collection of data (such as portions of the financial information corresponding to multiple entities) by financial applications executing in server systems 160A-160B. Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts. In addition, data store 180 may be spread over several geographies as corresponding database servers.

Each of server systems 160A-160B represents a server, such as a web/application server, executing business/financial applications capable of performing tasks requested by users using one of client systems 110A-110C. These tasks relate to management of details of various financial transactions performed by the business organization (and its various entities).

A server system may perform the tasks on data maintained internally or on external data (e.g., stored in data store 180) and then send the result of performance of the tasks to the requesting client system. Examples of such financial applications are Hyperion Enterprise and Hyperion Financial Management—Fusion Edition noted above. The financial application may be maintaining portions of the financial information corresponding to the different business entities belonging to a business organization.

A financial consolidation application (FCA), executing in one of server systems 160A-160B, provides a consolidated (often single) view of financial data of the business organization. In other words, a FCA consolidates the portions of the financial data maintained corresponding the multiple business entities. The data underlying such information may be maintained by a single instance of a financial application (providing access using client server architecture). Alternatively, the data corresponding to different entities may be located at different geographical sites, which is managed using corresponding instances of the financial application, and a consolidation application implemented external to the financial applications may be used for consolidation of the financial data.

In one embodiment, the FCA is implemented as a part of the financial applications noted above. The operation of a deployed FCA entails two portions: (1) metadata which defines the structure/schema (in particular classification, in the illustrative example) of various data elements in the financial data of the business organization; and (2) actual financial data (containing one or more transactions) classified according to the various classifications specified in the metadata.

There may be several FCAs executing within a business organization, and accordingly there may be a need to migrate from one FCA to another. Also, as noted in the Background section, migration may be needed when the business organization has become large and it is desirable that the business move for a FCA suited for small or mid-size organizations to another FCA suited for large sized organizations.

Migration from a "source" FCA (containing the metadata and actual data) to a "target" FCA (to which data is sought to be migrated) typically entails first mapping the existing metadata of the source FCA to a new metadata/structure of the target FCA, and then moving the actual financial data from the source FCA to the target FCA, while associating the data elements/transactions with the new metadata, according to the mapping. In one embodiment, the source FCA is Hyperion Enterprise application and the target FCA is Hyperion Financial Management—Fusion Edition, Application.

Migration tool 150, provided according to several aspects of the present invention, simplifies migration from a source FCA to a target FCA. The specific challenges to migration of financial consolidation applications and the manner in which migration tool 150 overcomes the specific challenges is described below with examples.

III. Migrating Categories to Dimensions

III.A. Introduction

One challenge with migration of financial consolidation applications is related to the classification of the financial data/transactions. Such classifications may be required for simplifying maintenance and/or generating reports. Thus, a source FCA may store the financial information classified according to one structure (or schema), while the target FCA may be designed to store information according to another structure.

In one embodiment, the source FCA classifies the financial data/transactions according to categories specified by a user/administrator, each category representing a type of data used by the source FCA. The source FCA facilitates the user to specify any desired category and to associate data/transactions with the specified categories. Examples of categories may be "Budget" representing budget data, "Actual" representing the actual data (of the current year), "Lastyr" representing last year's data, and "5YrHst" representing five-year historical data. Each category may be associated with attributes such as the start year, the number of periods it contains, the number of periods per year, and the starting period. Each category (e.g., "Actual") may also be associated with a prior category (e.g., "LastYr") indicating the associated category follows the prior category in the financial timeline (current year following the last year).

In contrast, the target FCA classifies the financial data/transactions according to several dimensions, each dimension representing a possibly fixed set of values. The set of dimensions are pre-specified (hardcoded before shipment) in the target FCA, with the set of values of some of the dimensions being pre-specified as well. Examples of dimensions are "Scenario" dimension having the set of values ["Actual", "Budget", "Forecast"], "Year" dimension having the set of years, and "Account" dimension having the set of accounts.

Each dimension may be viewed as a corresponding axis of a graph, with the values of the dimension representing coordinates along the corresponding axis. Graph 370 of FIG. 3C represents a two dimensional graph with the year dimension as the X-axis and the scenario dimension as the Y-axis. The values of each dimension are marked as coordinates on the corresponding axis, with the year values on the X-axis and scenario values on the Y-axis. Similarly, other dimensions may be viewed as being part of a multi-dimensional graph. The target FCA, in one embodiment, stores data/transactions associated with corresponding values for some of the dimensions.

Migration tool 150, according to an aspect of the present invention, simplifies the migration of the categories of the source FCA to the dimensions of the target FCA as described below with examples.

III.B. Simplifying Migration of Categories to Dimensions

Figure 2:
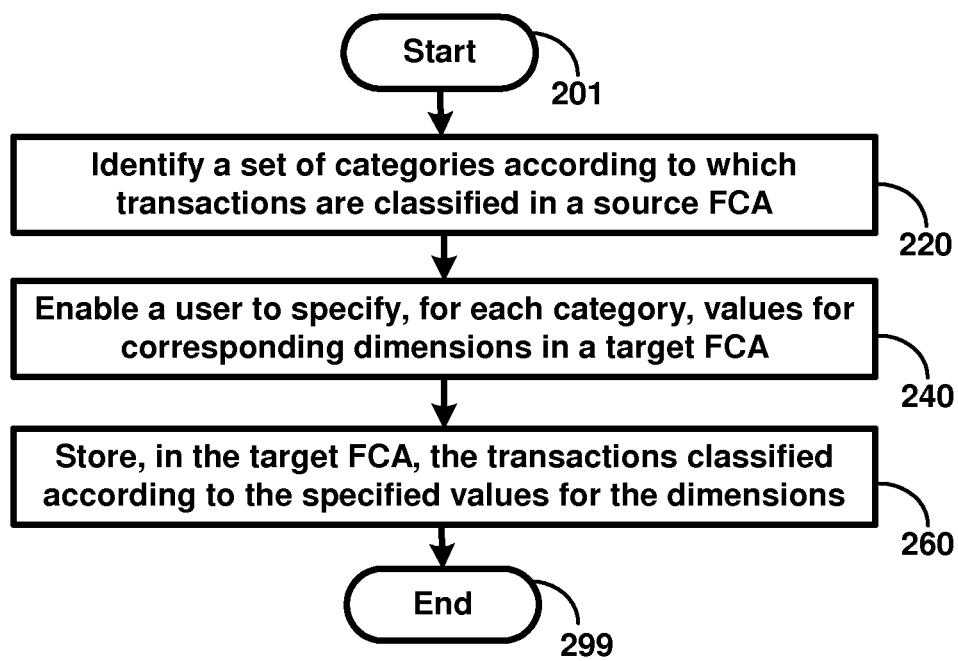
FIG. 2 is a flow chart illustrating the manner in which migration of categories of a source financial consolidation application to dimensions of a target financial consolidation application is simplified according to an aspect of the present invention.

FIG. 2 is a flow chart illustrating the manner in which migration of categories of a source FCA to dimensions of a target FCA is simplified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, migration tool 150 identifies a set of categories according to which transactions are classified in a source FCA. Migration tool 150 may examine the metadata of the source FCA to identify the set of categories. Thus, migration tool 150 may identify and include "Actual", "LastYr", etc. in the set of categories.

In step 240, migration tool 150 enables a user to specify, for each category, values for corresponding dimensions of a target FCA. For example, a user interface displaying the set of categories identified in step 220, and corresponding lists of values of the dimensions may be displayed to the user. The user may then select the desired values for the dimensions in the displayed lists for each of the categories. For example, the user may specify for category "LastYr", the value "Actual" in the scenario dimension and the year 2007 in the year dimension.

In addition, migration tool 150 also determines for each category, proposed mapping values in the different dimensions. The proposed mapping values are then displayed as a suggestion to the user on the user interface. In one embodiment, the value of the start year attribute of each category is determined to be value in the year dimension. The user is enabled only to specify the value in the scenario dimension.

In step 260, migration tool 150 stores, in the target FCA, the transactions classified according to the specified values for the dimensions. For example, all the transactions that were classified as "LastYr" in the source FCA are now stored in the target FCA associated with the value "Actual" in the scenario dimension and the year 2007 in the year dimension. The flow chart ends in step 299.

Thus, migration tool 150 simplifies the migration of categories of the source FCA to the dimensions of the target FCA. The manner in which such migration is performed in described below with examples.

III.C. Illustrative Example

FIGS. 3A-3C and 4A-4B together illustrates the manner in which categories of a source FCA are migrated to dimensions of a target FCA in one embodiment. Each of display area 300 of FIGS. 3A-3B, display area 600 of FIG. 6A and display area 650 of FIG. 6B (described in detail below) depicts a portion of a user interface displayed on a display unit (not shown) associated with a client system such as 110A-110C from which a user is accessing migration tool 150. Display areas 300, 600 and 650 may be provided as part of a set of user interfaces designed to receive user inputs prior to starting of the migration from source FCA to target FCA.

Figure 3A:
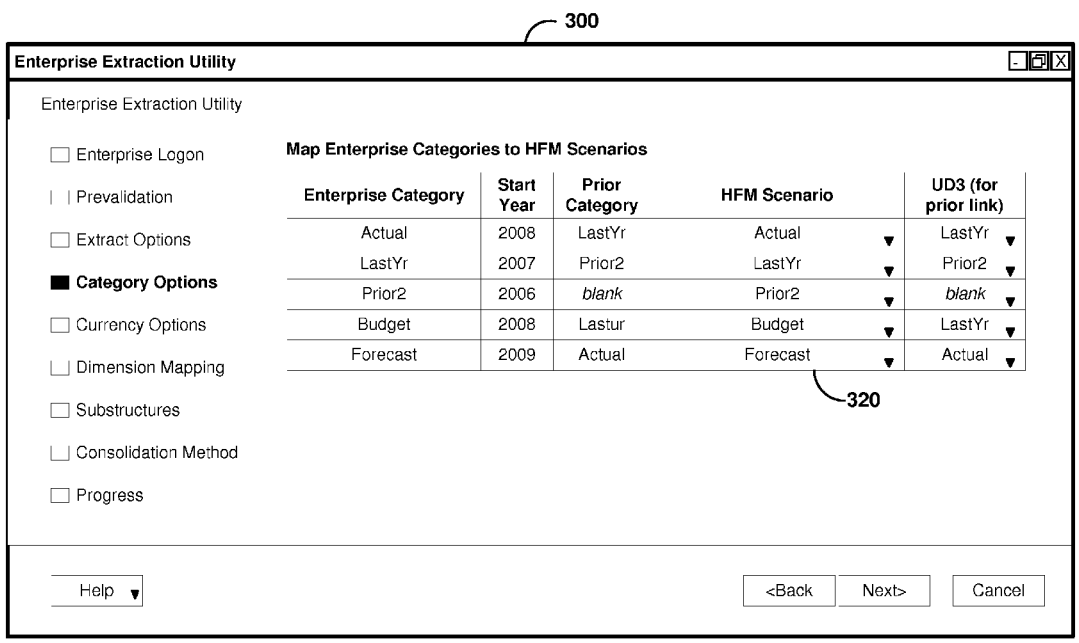
FIG. 3A depicts a user interface which enables a user to specify for each category of the source financial consolidation application, values for the corresponding dimensions in the target financial consolidation application in one embodiment.

Display area 300 of FIG. 3A depicts a user interface which enables a user to specify for each category of the source FCA, values for the corresponding dimensions in the target FCA. Thus, display area 320 shows the categories and values for the dimensions as corresponding rows in a tabular form, with the "Enterprise Category" column indicating the name of each category, and the "Start Year" and "Prior Category" columns indicating the values of the corresponding attributes of each category. The "HFM Scenario" column provides a list of values of the scenario dimension as corresponding drop down boxes for each category.

A user may specify the desired value for the scenario dimension using the drop down box corresponding to each category. As noted above, migration tool 150 determines the value for the year dimension for each category as the value of the "Start Year" attribute/column. It may be appreciated that the display of start year and prior category contemporaneously (at the same time) on the display unit facilitates the user to select the appropriate ones of the scenario values.

Figure 3B:
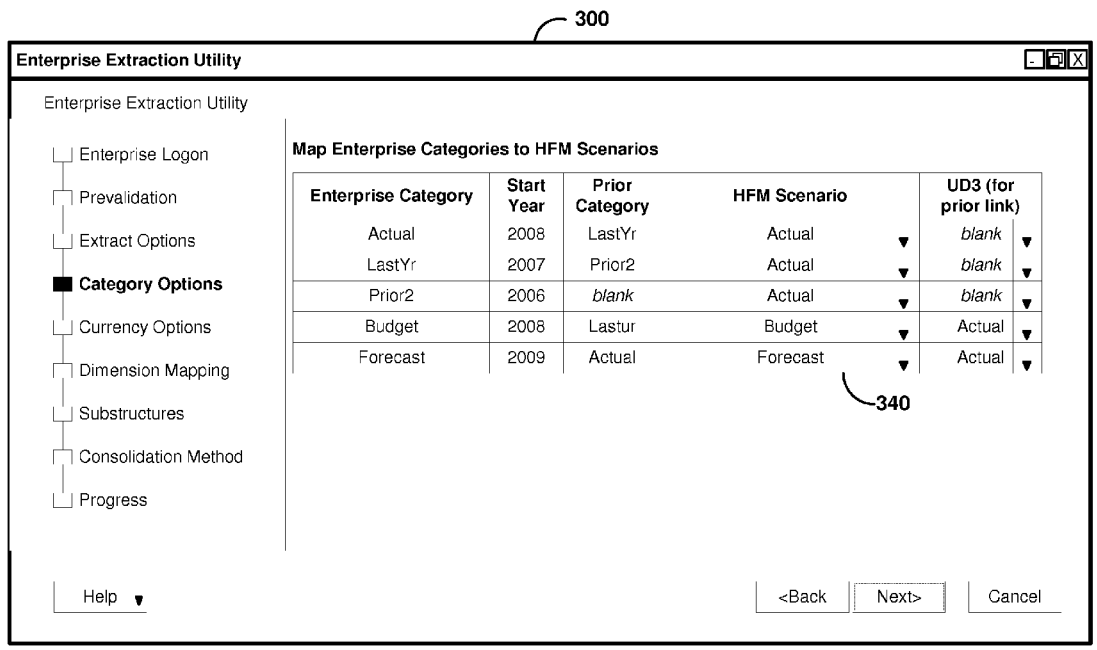
FIG. 3B depicts a user interface (of FIG. 3A) after the user has specified the desired values of the scenario dimension for the categories of the source financial consolidation application in one embodiment.
Figure 3C:
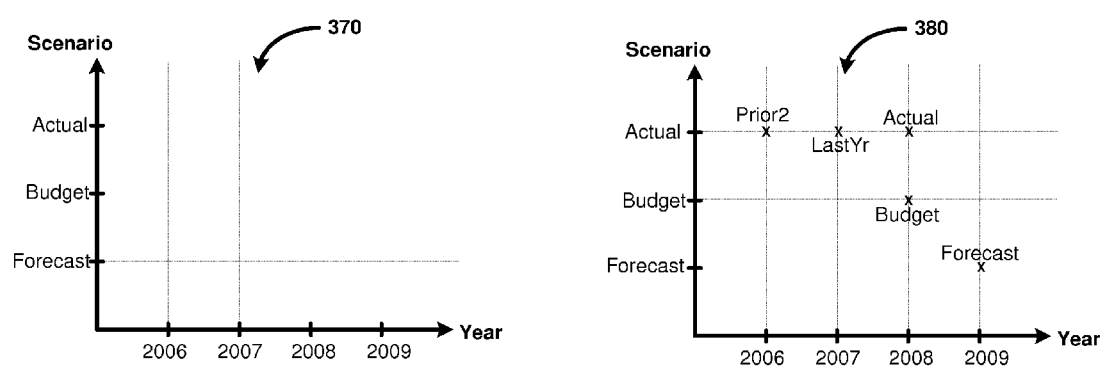
FIG. 3C depicts a graphical representation of the mapping between the categories of the source financial consolidation application to the dimensions of the target financial consolidation application in one embodiment.

Display area 300 of FIG. 3B depicts a user interface after the user has specified the desired values of the scenario dimension for the categories of the source FCA. It may be observed that the values of "HFM Scenario" column in display area 340 are different from that in display area 320. In particular, the three categories "Actual", "LastYr" and "Prior2" are all mapped to the value "Actual" in the scenario dimension, though they have different values (2008, 2007 and 2006) in the year dimension (as shown in the "Start Year" column).

FIG. 3C depicts a graphical representation of the mapping between the categories of the source FCA to the dimensions of the target FCA in one embodiment. As noted above, graph 370 represents a two-dimensional graph with the year dimension as the X-axis and the scenario dimension as the Y-axis. Graph 380 represents the same graph populated with the mapping of the categories and values of the dimensions shown in display area 340 of FIG. 3B. Thus, in graph 380, the three categories "Actual", "LastYr" and "Prior2" are all shown against the coordinate "Actual" along the scenario dimension/Y-axis and the coordinates 2008, 2007 and 2006 respectively along the year dimension/X-axis.

In response to the mapping shown in display area 340, migration tool 150 stores the data/transactions in the target FCA classified according to the values of the dimensions specified for each category in the source FCA, as described in detail below with respect to an example.

FIG. 4A depicts a portion of a data file maintained by source FCA for storing financial transactions in one embodiment. Data element 420 "LastYr" (in the first line of the data file) indicates that the set of transactions stored in the data file is classified as "LastYr" category (and accordingly represents last year transactions). Migration tool 150, then, generates a file that can be loaded into the target FCA, based on the mapping shown in display area 340. The file is generated corresponding to the data shown in FIG. 4A. The result of loading the generated file into the target FCA is described in detail below.

FIG. 4B depicts a portion of a data file maintained by the target FCA and containing transactions migrated from the source FCA in one embodiment. The migrated transactions may be similar to the transactions shown in FIG. 4A. Each of the transactions shown in lines 451-453 is in the form of a semi-colon separated list of data element. It may be observed that the transactions are stored associated with the value "Actual" in the scenario dimension (the first data element in each line) and the value "2007" in the year dimension (the second data element in each line), based on the mapping of the "LastYr" category to the corresponding values of the dimensions in display area 340.

Migration tool 150 may similarly move other data from the source FCA to the target FCA while associating the transactions with the appropriate values of the dimensions as specified by the user using the user interface of FIGS. 3A and 3B.

IV. Migrating Substructures to Custom Dimensions

IV.A. Introduction

A financial consolidation application commonly stores break up values associated with the accounts (defined in the FCA) The detailed break up values for accounts is typically captured using subaccounts. Similarly, a financial consolidation application commonly stores break up values associated with the entities or sub entities (defined in the FCA) The break up values for entities or sub entities is typically captured using substructures defined in the financial consolidation application. It may be accordingly required that such break up values be also moved/copied as part of the migration from one FCA to another.

In one embodiment, the source FCA contains first-level and second-level subaccounts for capturing the additional information about the accounts. The first-level/second-level subaccounts may store break up values associated with an account, such as the product, market, channels, types of elimination, and balance sheet related information. The source FCA also contains substructures for capturing the break up values associated with transactions such as adjustment from input, local currency translated to parent currency, and detail of the balance by cost center or business center or product line.

In contrast, the target FCA requires that all such break up values be captured using one of a pre-defined set of dimensions (that is, as values for one of the dimensions). The target FCA provides for only four (a fixed number) custom dimensions (named Custom1, Custom2, Custom3, and Custom4) for capturing the break up values. The first-level and second-level subaccounts are mapped to two of the custom dimensions (by default, Custom1 and Custom2). In other words, the information in these two subaccounts in the source FCA is migrated to the target FCA as values of the respective custom dimensions.

Thus, it may be necessary that the substructures capturing information about the transactions be mapped to one of the other two custom dimensions (by default, Custom4). However, the target FCA also contains a Value dimension representing different types of values stored in the target FCA and can include the input currency, parent currency, adjustments, and consolidation details such as proportion, elimination, and contribution. Accordingly, some of the substructures (e.g., adjustments) may be mapped to the Value dimension, while other substructures (e.g. cost centers) need to be mapped to Custom4 dimension.

Migration tool 150, according to an aspect of the present invention, simplifies the migration of the substructures of the source FCA to the custom/value dimensions of the target FCA as described below with examples.

IV.B. Simplifying Migration of Substructures to Custom Dimensions

Figure 5:
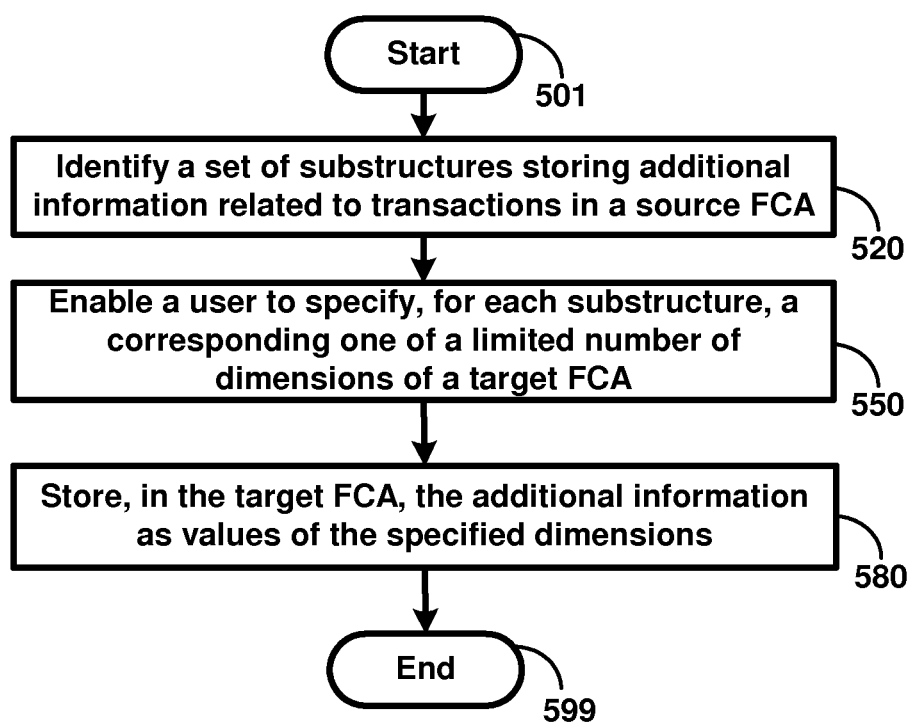
FIG. 5 is a flow chart illustrating the manner in which migration of substructures of a source financial consolidation application to custom dimensions of a target financial consolidation application is simplified according to an aspect of the present invention.

FIG. 5 is a flow chart illustrating the manner in which migration of substructures of a source FCA to custom dimensions of a target FCA is simplified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 501, in which control immediately passes to step 520.

In step 520, migration tool 150 identifies a set of substructures storing break up values related to transactions in a source FCA. The substructures may be identified by inspecting the metadata of the source FCA. Thus, migration tool 150 may identify and include substructures for adjustments, currency translation, cost centers, etc. in the set of substructures.

In step 550, migration tool 150 enables a user to specify, for each substructure, a corresponding one of a limited number of dimensions of a target FCA. As noted above, the substructures of the source FCA are required to be mapped to either a custom dimension (Custom4) or the Value dimension in the target FCA. Accordingly, a user interface displaying the set of substructures identified in step 550, and limited number of dimensions may be displayed to the user. The user may then select the desired dimension (e.g., either Value or Custom4) for each of the substructure.

In addition, migration tool 150 also determines for each substructure, a proposed mapping dimension and then displays the determined dimension as a suggestion to the user on the user interface. In one embodiment, substructures which are determined to be mapped to the Value dimension are allowed to be changed to the Custom dimension, with the user not being allowed to change in the other direction (from Custom to Value dimension).

In step 580, migration tool 150 stores in the target FCA, the break up values of the specified dimensions. Thus, in response to the user mapping a substructure "ADJUST" storing adjustments to the "Value" dimension, migration tool 150 retrieves the data elements stored in the "ADJUST" substructure in the source FCA and then stores the data elements (with appropriate conversion) as values of the Value dimension in the target FCA. The flow chart ends in step 599.

Thus, migration tool 150 simplifies the migration of substructures of the source FCA to the custom dimensions of the target FCA. The manner in which such migration is performed in described below with examples.

IV.C. Illustrative Example

Figure 6A:
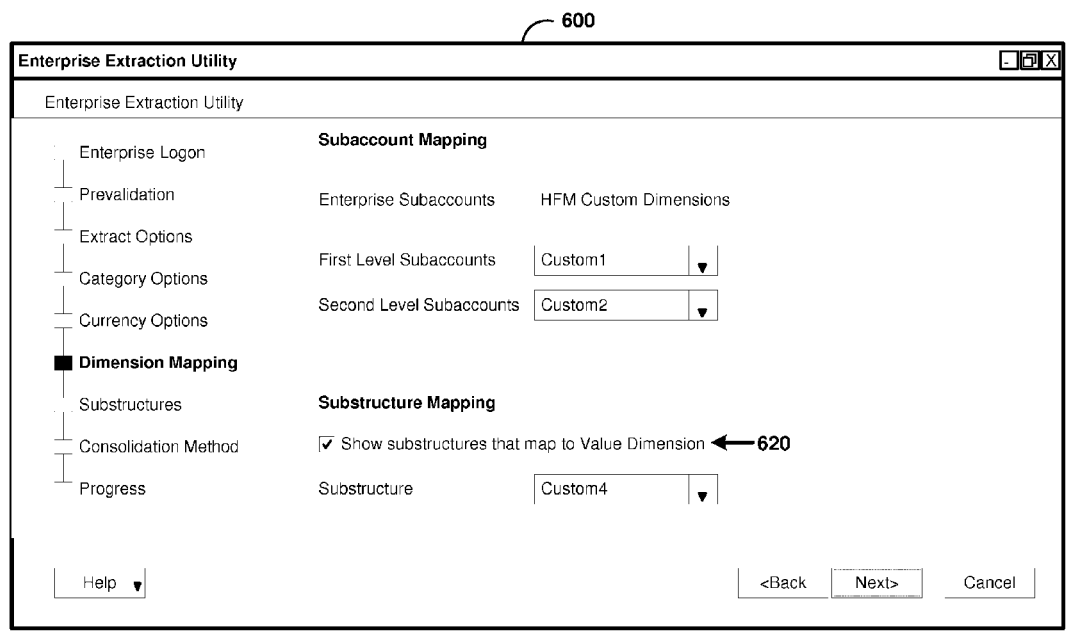
FIGS. 6A and 6B together depict a user interface that enables a user to specify for the subaccounts and substructures of the source financial consolidation application, the corresponding custom dimensions in the target financial consolidation application in one embodiment.

FIGS. 6A-6B and 7A-7D together illustrates the manner in which substructures of a source FCA are migrated to custom dimensions of a target FCA in one embodiment. Display area 600 of FIG. 6A depicts a user interface that enables a user to specify for the subaccounts and substructures of the source FCA, the corresponding custom dimensions in the target FCA. Display area 600 indicates that the first-level subaccounts, second-level subaccounts and the substructures are by default mapped respectively to the Custom1, Custom2 and Custom4 dimensions defined in the target FCA. A user may select checkbox 620 to indicate that substructures mapped to Value dimension are to be displayed.

Figure 6B:
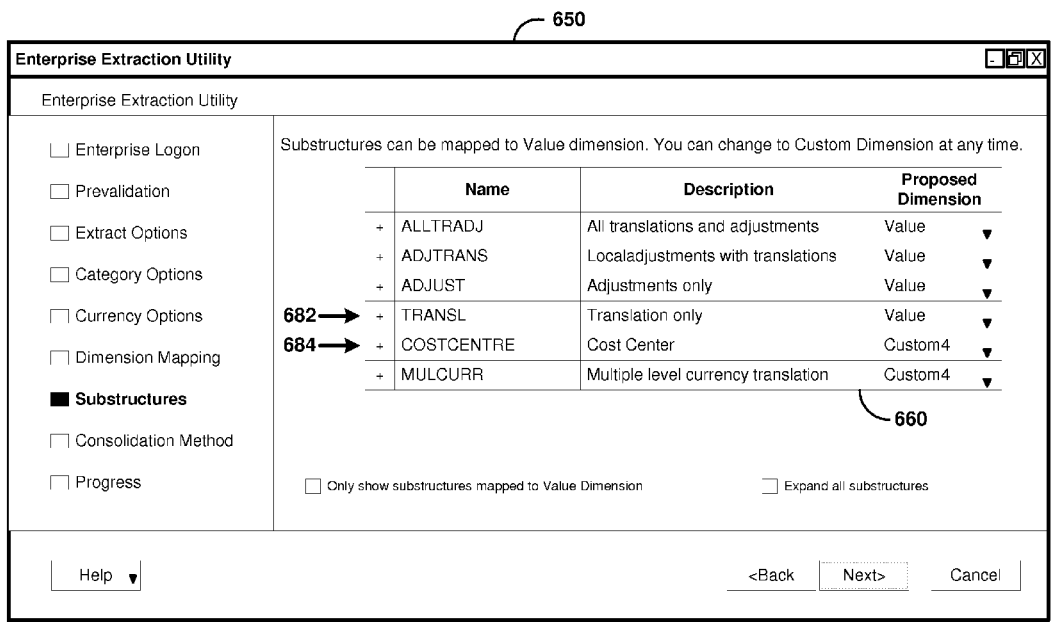

Display area 650 of FIG. 6B is displayed in response to user selecting checkbox 620 and then clicking "Next>" button shown in FIG. 6A. Display area 650 enables a user to specify, for each substructure, a corresponding one of Value or Custom4 dimension (or the corresponding custom dimension to which substructures are to be mapped as indicated by the user in display area 600). Thus, display area 660 shows the substructures and dimensions as corresponding rows in a tabular form, with the "Name" and "Description" columns respectively indicating the name and description of each substructure. The "Proposed Dimension" column provides a list of dimensions as corresponding drop down boxes for each substructure.

As noted above, in one embodiment, a user is enabled to change the mapping of only the substructures that have been proposed to be mapped to Value dimension (for example, row 682). Those substructures that have been proposed to be mapped to Custom dimension (for example, row 684) cannot be changed by the user. The user may select the desired mapping (either to Value or Custom dimension) for each substructure in the "Proposed Dimension" column.

In response to the mapping shown in display area 660, migration tool 150 moves the additional information specified in the substructures of the source FCA as corresponding values of the indicated dimensions in the target FCA, as described in detail below.

FIG. 7A depicts a portion of a data file maintained by source FCA for storing financial transactions and cost center information in substructures in one embodiment. It may be observed that the first data element (up to the first comma) in each of lines 721-723 contains data corresponding to the entity "US100" and a substructure (as indicated by the ".") specifying the specific cost center ("CC100", "CC200" and "CC300") associated with each transaction.

FIG. 7B depicts a portion of a data file maintained by the target FCA and containing cost center substructures migrated from the source FCA in one embodiment. Lines 741-743 depict transactions that have been migrated from the source FCA, and are similar to transactions 721-723. It may be observed that the data stored in the substructure of each transaction in lines 721-723 are now stored as similar values in the Custom4 dimension/column ("<C4>") in response to the mapping shown in row 684 of FIG. 6B.

Thus, migration tool 150 migrates the substructures from the source FCA as values of a custom dimension (Custom4) in the target FCA. The manner in which substructures are migrated to the Value dimension is described below with examples.

FIG. 7C depicts a portion of another data file maintained by source FCA for storing financial transactions and currency translation information in substructures in one embodiment. It may be observed that the first data element (up to the first comma) in each of lines 761-762 contains data corresponding to the entity "US100" and a substructure (as indicated by the ".") specifying whether the transaction is a currency translation ("Trans") or user input ("Input").

FIG. 7D depicts a portion of a data file maintained by the target FCA and containing currency translation substructures migrated from the source FCA in one embodiment. Lines 781-782 depict transactions that have been migrated from the source FCA, and are similar to transactions 761-762. It may be observed that the data stored in the substructure of each transaction in lines 761-762 are now stored as corresponding values V#<Entity Currency>, V#<Parent Currency> in the Value dimension/column ("<value>") in response to the mapping shown in row 682 of FIG. 6B.

Thus, migration tool 150 migrates the substructures from the source FCA as values of the Value dimension in the target FCA. Migration tool 150 may similarly migrate the other substructures to either the Value dimension or the Custom dimension of the target FCA, based on the mapping specified in the user interface of FIG. 6B.

V. Migrating Chart Logic to Account Hierarchy

V.A. Introduction

Accounts are commonly used in financial consolidation applications to keep track of the financial transactions. Some of the accounts may be computed based on the transactions associated with other accounts. Migration of such computed accounts may pose a challenge, as described in detail below.

In one embodiment, the source FCA has a chart logic which specifies the manner in which accounts are to be computed based on pre-defined conventions. The chart logic contains an ordered sequence of accounts, with the computed accounts being associated with a desired convention indicating the computation to be performed. For example, a first convention specifying a account may indicate that the associated account is to be computed as a sum of a set of accounts, where the set includes all the accounts in the sequence that are prior to the associated account, starting from the specified account.

In contrast, the target FCA maintains an account hierarchy such that an account at any inner node (not a leaf) is computed as the sum of the accounts at the children of the inner node. Thus, the first convention noted above may be correspondingly represented in the account hierarchy with the associated account as an inner node and the set of accounts as children to the inner node. It may accordingly be required that the conventions specified in the chart logic of the source FCA be captured/represented as part of the account hierarchy in the target FCA.

Migration tool 150, according to an aspect of the present invention, simplifies the migration of the chart logic of the source FCA to the account hierarchy of the target FCA as described below with examples.

V.B. Simplifying Migration of Chart Logic to Account Hierarchy

Figure 8:
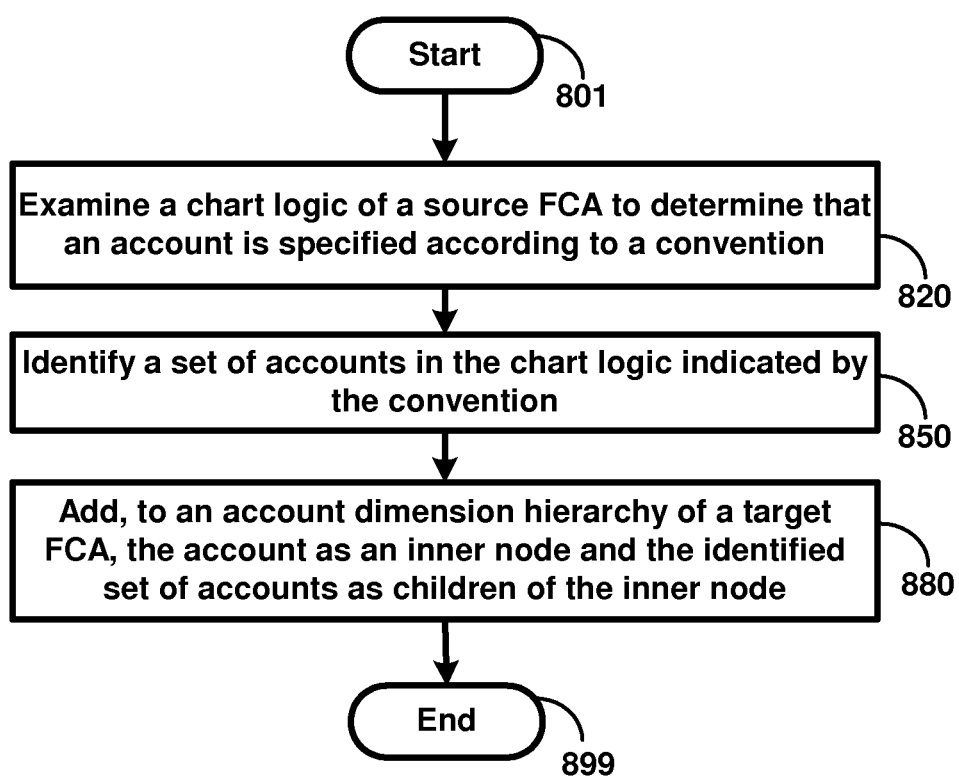
FIG. 8 is a flow chart illustrating the manner in which migration of chart logic of a source financial consolidation application to an account hierarchy of a target financial consolidation application is simplified according to an aspect of the present invention.

FIG. 8 is a flow chart illustrating the manner in which migration of chart logic of a source FCA to an account hierarchy of a target FCA is simplified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 801, in which control immediately passes to step 820.

In step 820, migration tool 150 examines a chart logic of the source FCA to determine that an account is specified according to a convention. The convention specifies the manner in which the account is to be computed (for example, such as the first convention described above).

In step 850, migration tool 150 identifies a set of accounts in the chart logic indicated by the convention. For example, if the first convention is determined in step 820, migration tool 150 may identify the set of accounts to be from the account specified in the convention to the account just prior to the computed account.

In step 880, migration tool 150 adds, to the account dimension hierarchy of the target FCA, the account determined in step 820 as a inner node and the identified set of accounts as children of the inner node. Accordingly, the target FCA computes the determined account as the sum of the identified set of accounts. The flow chart ends in step 899.

V.C. Illustrative Example

Each of FIGS. 9A and 9B illustrates the manner in which a chart logic of a source FCA is migrated to an account hierarchy of a target FCA in one embodiment. Referring to FIG. 9A, table 910 depicts a chart logic with the ordered sequence of accounts ("Acct1" to "Acct5") shown in the left column, and any computation logic statements shown in the right column. It may be observed that account "Acct5" is shown associated with a corresponding logic statement. The convention "SUB (#Acct3)" there indicates that Acct5 is to be computed as the sum of the set of accounts in the sequence prior to Acct5, starting from Acct3. In other words, Acct5 is to be computed as the sum of Acct3 and Acct4.

Migration tool 150, in response to determining the SUB convention for Acct5, identifies the set of accounts to be [Acct3, Acct4], and then adds to the account hierarchy of the target FCA, Acct5 as the inner node and the set of accounts [Acct3, Acct4] as the children of the inner node, as shown in 930. It may be observed in 930, that Acct3 and Acct4 are added as children to Acct5. This cases the target FCA to compute Acct5 as the sum of Acct3 and Acct4, thereby replicating the logic specified in the source FCA.

Referring to FIG. 9B, table 960 depicts another chart logic containing the same sequence of accounts ("Acct1" to "Acct5"), but with different accounts having different sets of sub-accounts ("S1" to "S3"). The convention DTOT shown associated with Acct5 indicates that Acct5 is to be computed as the sum of the set of accounts in the sequence which are prior to Acct5 and which have the same set of sub-accounts as that of Acct5. Migration tool 150 accordingly, determines that Acct5 is to be computed as the sum of Acct2 and Acct4, and adds to the account hierarchy of the target FCA, Acct5 as a inner node having child nodes as Acct2 and Acct4, as shown in 980.

Thus, migration tool 150 migrates the logic statements specified in the chart logic of the source FCA to corresponding representations (sub-trees) in the account hierarchy of the target FCA.

It should be further appreciated that the features described above can be implemented in various embodiments as a desired combination of one or more of hardware, executable modules, and firmware. The description is continued with respect to an embodiment in which various features are operative when the software instructions described above are executed.

VI. Digital Processing System

FIG. 10 is a block diagram illustrating the details of digital processing system 1000 in which various aspects of the present invention are operative by execution of appropriate executable modules in one embodiment. Digital processing system 1000 may correspond to any system executing migration tool 150.

Digital processing system 1000 may contain one or more processors (such as a central processing unit (CPU) 1010), random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present invention. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting shared environment 1025 and/or user programs 1026 (such as networking applications, database applications, etc.). Shared environment 1025 contains utilities shared by user programs, and such shared utilities include operating system, device drivers, virtual machines, flow engine, etc., which provide a (common) run time environment for execution of user programs/applications.

Graphics controller 1060 generates display signals (e.g., in RGB format) to display unit 1070 based on data/instructions received from CPU 1010. Display unit 1070 contains a display screen to display the images defined by the display signals (such as the user interfaces shown in FIGS. 3A-3B and 6A-6B). Input interface 1090 may correspond to a keyboard and a pointing device (e.g., touch-pad, mouse) and may be used to provide the user inputs required for several aspects of the present invention (such as those provided for interacting with the user interfaces shown in FIGS. 3A-3B and 6A-6B). Network interface 1080 provides connectivity to a network (e.g., using Internet Protocol), and may be used to communicate with other connected systems (such as server systems 160A-160B, data stores 180, etc.) of FIG. 1.

Secondary memory 1030 (representing a non-transitory storage/medium) may contain hard drive 1035, flash memory 1036, and removable storage drive 1037. Secondary memory 1030 may store the data (for example, portions of data files shown in FIGS. 4A-4B, 7A-7D, portions of chart logic and/or account hierarchy shown in FIGS. 9A-9B) and software instructions (for example, for performing the steps of FIGS. 2, 5 and 8), which enable digital processing system 1000 to provide several features in accordance with the present invention.

Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1040 or hard disk installed in hard drive 1035. These computer program products are means for providing software to digital processing system 1000. CPU 1010 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

VII. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of migrating financial data from a first financial consolidation application to a second financial consolidation application, said financial data comprising a plurality of transactions, said method being implemented in a digital processing system, said method comprising:
identifying a set of categories according to which said plurality of transactions are classified in said first financial consolidation application;
enabling a user to specify, for each of said set of categories, corresponding ones of the values for each of a set of dimensions, wherein each of the values represents a coordinate value in the corresponding dimension;
storing, in said second financial consolidation application, said plurality of transactions classified according to said corresponding ones of values for said set of dimensions specified for said set of categories,
wherein a transaction of a first category in said first financial consolidation application is stored in said second financial consolidation application associated with the values for said set of dimensions specified for said first category by said user,
wherein said digital processing system comprises at least a processor which retrieves instructions from a memory and executes the retrieved instructions to perform at least one of said identifying, said enabling and said storing.

2. The method of claim 1, wherein all of said set of dimensions are pre-specified in said second financial consolidation application, wherein said enabling comprises:
displaying for each of said set of categories, said pre-specified set of dimensions and a corresponding list of values on a display unit,
wherein said user selects said corresponding ones of the values from said corresponding list of values for each of said set of categories.

3. The method of claim 2, wherein said identifying further comprises determining a corresponding start year and a corresponding prior category for each of said set of categories,
wherein said displaying also displays contemporaneously on said display unit, said corresponding start year and said corresponding prior category for each of said set of categories,
wherein said displaying facilitates said user to select the appropriate ones of the values from said corresponding list of values for each of said set of categories.

4. The method of claim 3, wherein said pre-defined set of dimensions comprises a scenario dimension and a year dimension,
wherein the list of values for said scenario dimension includes at least one of "Actual", "Budget", and "Forecast",
wherein the list of values for said year dimension comprises a sequence of years,
wherein said user specifies, for each of said set of categories, one of said values for said scenario dimension and one of said sequence of years for said year dimension,
whereby said storing stores each of said plurality of transactions in said second financial consolidation application associated with the selected ones of values for respective two dimensions.

5. The method of claim 1, said method further comprising:
identifying a set of substructures storing break up information related to said plurality of transactions in said first financial consolidation application;
enabling said user to specify, for each of said set of substructures, a corresponding one of a subset of dimensions, wherein said subset of dimensions is contained in said set of dimensions; and
storing, in said second financial consolidation application, the break up information related to said plurality of transactions in said corresponding ones of said subset of dimensions.

6. The method of claim 5, wherein said subset of dimensions comprises a custom dimension and a value dimension, wherein said enabling comprises:
determining, for each substructure, either a corresponding one of said custom dimension and said value dimension; and
displaying for each of said set of substructures, said corresponding determined one of said custom dimension or said value dimension on a display unit,
wherein said user is enabled to select said custom dimension for a substructure determined to be said value dimension.

7. The method of claim 1, wherein said first financial consolidation application contains an ordered sequence of accounts in a chart logic, said method further comprising:
examining said chart logic to determine that a first account is defined to be a sum of a set of accounts by specifying a second account according to a first convention, wherein said first convention specifies that said set of accounts is formed by said second account and any intervening accounts between said second account and said first account in said ordered sequence of accounts, said first account and said second account being contained in said ordered sequence of accounts;
adding in an account dimension hierarchy of said second financial consolidation application, said first account as an first inner node and each of said set of accounts as children of said first inner node, wherein said second financial consolidation application is designed to compute each inner node as a sum of the corresponding children, thereby computing said first account as a sum of said set of accounts.

8. The method of claim 7, wherein said examining examines said chart logic to also determine that a third account is defined to be sum of a third set of accounts according to a second convention in said first financial consolidation application, wherein said second convention specifies that an account is to be included in said third set of accounts only if the sub-accounts of the account are identical to the sub-accounts of said third account, said third account and said third set of accounts being contained in said ordered sequence of accounts,
wherein said adding adds to said account dimension hierarchy said third account as a second inner node and each of said third set of accounts as children of said second inner node, thereby causing said second financial consolidation application to compute said third account as a sum of said third set of accounts.

9. A non-transitory machine readable medium storing one or more sequences of instructions for causing a system to migrate financial data from a first financial consolidation application to a second financial consolidation application, said financial data comprising a plurality of transactions, wherein execution of said one or more sequences of instructions by one or more processors contained in said system causes said system to perform the actions of:

identifying a set of categories according to which said plurality of transactions are classified in said first financial consolidation application;

enabling a user to specify, for each of said set of categories, corresponding ones of the values for each of a set of dimensions, wherein each of the values represents a coordinate value in the corresponding dimension;

storing, in said second financial consolidation application, said plurality of transactions classified according to said corresponding ones of values for said set of dimensions specified for said set of categories, wherein a transaction of a first category in said first financial consolidation application is stored in said second financial consolidation application associated with the values for said set of dimensions specified for said first category by said user.

10. The machine readable medium of claim 9, wherein all of said set of dimensions are pre-specified in said second financial consolidation application, wherein said enabling comprises:

displaying for each of said set of categories, said pre-specified set of dimensions and a corresponding list of values on a display unit, wherein said user selects said corresponding ones of the values from said corresponding list of values for each of said set of categories.

11. The machine readable medium of claim 10, wherein said identifying further comprises determining a corresponding start year and a corresponding prior category for each of said set of categories, wherein said displaying also displays contemporaneously on said display unit, said corresponding start year and said corresponding prior category for each of said set of categories, wherein said displaying facilitates said user to select the appropriate ones of the values from said corresponding list of values for each of said set of categories.

12. The machine readable medium of claim 9, further comprising one or more instructions for:

identifying a set of substructures storing break up information related to said plurality of transactions in said first financial consolidation application;

enabling said user to specify, for each of said set of substructures, a corresponding one of a subset of dimensions, wherein said subset of dimensions is contained in said set of dimensions; and storing, in said second financial consolidation application, the break up information related to said plurality of transactions in said corresponding ones of said subset of dimensions.

13. The machine readable medium of claim 12, wherein said subset of dimensions comprises a custom dimension and a value dimension, wherein said enabling comprises one or more instructions for:

determining, for each substructure, either a corresponding one of said custom dimension and said value dimension; and displaying for each of said set of substructures, said corresponding determined one of said custom dimension or said value dimension on a display unit, wherein said user is enabled to select said custom dimension for a substructure determined to be said value dimension.

14. The machine readable medium of claim 9, wherein said first financial consolidation application contains an ordered sequence of accounts in a chart logic, further comprising one or more instructions for:

examining said chart logic to determine that a first account is defined to be a sum of a set of accounts by specifying a second account according to a first convention, wherein said first convention specifies that said set of accounts is formed by said second account and any intervening accounts between said second account and said first account in said ordered sequence of accounts, said first account and said second account being contained in said ordered sequence of accounts;

adding in an account dimension hierarchy of said second financial consolidation application, said first account as a first inner node and each of said set of accounts as children of said first inner node, wherein said second financial consolidation application is designed to compute each inner node as a sum of the corresponding children, thereby computing said first account as a sum of said set of accounts.

15. The machine readable medium of claim 14, wherein said examining examines said chart logic to also determine that a third account is defined to be sum of a third set of accounts according to a second convention in said first financial consolidation application, wherein said second convention specifies that an account is to be included in said third set of accounts only if the sub-accounts of the account are identical to the sub-accounts of said third account, said third account and said third set of accounts being contained in said ordered sequence of accounts, wherein said adding adds to said account dimension hierarchy said third account as a second inner node and each of said third set of accounts as children of said second inner node, thereby causing said second financial consolidation application to compute said third account as a sum of said third set of accounts.

16. A digital processing system comprising:

a processor;

a random access memory (RAM);

a machine readable medium to store one or more instructions when retrieved into said RAM and executed by said processor forms a migration tool operable to migrate financial data from a first financial consolidation application to a second financial consolidation application, said financial data comprising a plurality of transactions, said migration tool performing the actions of:

identifying a set of categories according to which said plurality of transactions are classified in said first financial consolidation application;

enabling a user to specify, for each of said set of categories, corresponding ones of the values for each of a set of dimensions, wherein each of the values represents a coordinate value in the corresponding dimension;

storing, in said second financial consolidation application, said plurality of transactions classified according to said corresponding ones of values for said set of dimensions specified for said set of categories, wherein a transaction of a first category in said first financial consolidation application is stored in said second financial consolidation application associated with the values for said set of dimensions specified for said first category by said user.

17. The digital processing system of claim 16, wherein said machine readable medium further stores a first set of instructions and a second set of instructions,
   wherein said first set of instructions when retrieved into said RAM and executed by said processor forms said first financial consolidation,
   wherein said second set of instructions when retrieved into said RAM and executed by said processor forms said second financial consolidation application.

18. The digital processing system of claim 16, wherein all of said set of dimensions are pre-specified in said second financial consolidation application, wherein said migration tool for said enabling, performs the actions of:
   determining a corresponding start year and a corresponding prior category for each of said set of categories; and
   displaying contemporaneously, for each of said set of categories, said corresponding start year, said corresponding prior category, said pre-specified set of dimensions and a corresponding list of values on a display unit,
   wherein said user selects said corresponding desired values from said corresponding list of values for each of said set of categories.

19. The digital processing system of claim 16, said migration tool further performs the actions of:
   identifying a set of substructures storing break up information related to said plurality of transactions in said first financial consolidation application;
   enabling said user to specify, for each of said set of substructures, a corresponding one of a subset of dimensions, wherein said subset of dimensions is contained in said set of dimensions; and
   storing, in said second financial consolidation application, the break up information related to said plurality of transactions in said corresponding ones of said subset of dimensions.

20. The digital processing system of claim 16, wherein said first financial consolidation application contains an ordered sequence of accounts in a chart logic, wherein said migration tool further performs the actions of:
   examining said chart logic to determine that a first account is defined to be a sum of a set of accounts according to a first convention, said set of accounts being contained in said ordered sequence of accounts;
   identifying the specific ones of said ordered sequence of accounts to be included in said set of accounts as indicated by said first convention; and
   adding in an account dimension hierarchy of said second financial consolidation application, said first account as a inner node and each of said set of accounts as children of said inner node, wherein said second financial consolidation application is designed to compute each inner node as a sum of the corresponding children, thereby computing said first account as a sum of said set of accounts.

\* \* \* \* \*

UNITED STATES PATENT AND TRADEMARK OFFICE
CERTIFICATE OF CORRECTION

PATENT NO. : 8,924,273 B2  Page 1 of 1
APPLICATION NO. : 13/269633
DATED : December 30, 2014
INVENTOR(S) : Ramachandra et al.

It is certified that error appears in the above-identified patent and that said Letters Patent is hereby corrected as shown below:

In the Drawings

On sheet 3 of 13, in drawings, in figure 3A, line 10, delete "Lastur" and insert -- LastYr --, therefor.

On sheet 4 of 13, in drawings, in figure 3B, line 10, delete "Lastur" and insert -- LastYr --, therefor.

On sheet 9 of 13, in drawings, in figure 6B, line 8, delete "Localadjustments" and insert -- Local adjustments --, therefor.

In the Specification

In column 4, line 63, delete "transations" and insert -- transactions --, therefor.

Signed and Sealed this
First Day of September, 2015

Michelle K. Lee
*Director of the United States Patent and Trademark Office*